S. M. PALMER.
RING AND PULLEY FOR NECK-YOKES.

No. 195,840. Patented Oct. 2, 1877.

WITNESSES:

INVENTOR:
S. M. Palmer.
BY
ATTORNEYS.

UNITED STATES PATENT OFFICE.

SAMUEL M. PALMER, OF GLENS FALLS, NEW YORK, ASSIGNOR TO WALTER McDONALD, OF SAME PLACE.

IMPROVEMENT IN RINGS AND PULLEYS FOR NECK-YOKES.

Specification forming part of Letters Patent No. 195,840, dated October 2, 1877; application filed April 16, 1877.

*To all whom it may concern:*

Figure 1:
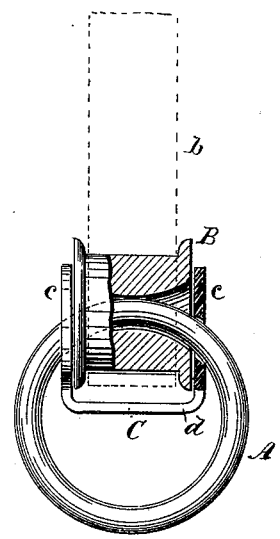
Figure 2:
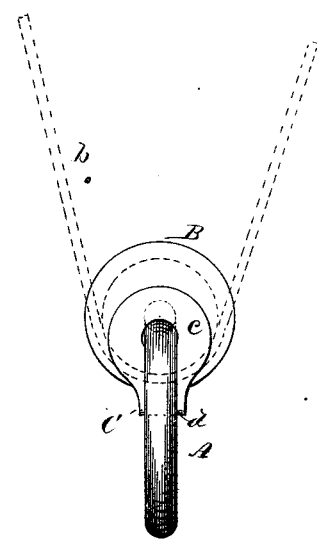

Be it known that I, SAMUEL M. PALMER, of Glens Falls, Warren county, New York, have invented a new and Improved Combined Pulley and Ring for Neck-Yokes, of which the following is a specification:

Figure 1 is a side elevation, in part section, and Fig. 2 a front elevation.

The object of my invention is to provide a device for attachment to neck-yokes for securing the breast-strap of harness, which will permit it to move freely without wearing and without jerking with every motion of the tongue to which the neck-yoke is attached.

In the drawing, A is a ring, upon which is placed the pulley B, having flanges $a$ for retaining the strap $b$ that passes around it.

The bore of the pulley is bell-shaped at each end to conform to the curvature of the ring A.

C is a guard, consisting of two disks, $c\,c$, perforated to receive the ring A, and connected by the strap $d$, which is bent twice at right angles, forming, together with the face of the pulley A, an aperture, through which the strap $b$ passes around the said pulley.

The strap, by means of this improvement, is prevented from wearing, and is permitted to move freely through the ring, preventing the jerking of the horse's collar and the galling of the horse's shoulder.

I am aware that the pulleys of neck-yokes have been made to turn on straight centers; but none, to my knowledge, have been made to turn on the ring, so as to prevent the pole from jerking laterally the shoulders of the horses when an obstruction has been encountered.

What I claim is—

A neck-yoke provided with a pulley whose bearing is flared at each end, and which is made to turn on the ring, as shown and described, for the purpose specified.

SAML. M. PALMER.

Witnesses:
C. SEDGWICK,
ALEX. F. ROBERTS.